United States Patent
Lin et al.

(10) Patent No.: US 10,138,677 B2
(45) Date of Patent: Nov. 27, 2018

(54) TORSION ASSEMBLY FOR A CURTAIN

(71) Applicant: MACAUTO INDUSTRIAL CO., LTD., Tainan (TW)

(72) Inventors: Paul Lin, Tainan (TW); Hung-Ming Yen, Tainan (TW)

(73) Assignee: MACAUTO INDUSTRIAL CO., LTD., Tainan (TW)

( * ) Notice: Subject to any disclaimer, the term of this patent is extended or adjusted under 35 U.S.C. 154(b) by 161 days.

(21) Appl. No.: 15/448,860

(22) Filed: Mar. 3, 2017

(65) Prior Publication Data

US 2018/0252034 A1    Sep. 6, 2018

(51) Int. Cl.
*E06B 9/60* (2006.01)
*B65H 75/48* (2006.01)
*B60J 1/20* (2006.01)

(52) U.S. Cl.
CPC .......... *E06B 9/60* (2013.01); *B60J 1/2016* (2013.01); *B65H 75/486* (2013.01)

(58) Field of Classification Search
CPC .......... E05D 13/1261; E05Y 2900/108; B60G 2206/427; B60G 11/18; F16C 11/12; E06B 9/50; E06B 9/60; E06B 9/38; E06B 9/262; E06B 9/24; E06B 9/40; E06B 9/80; E06B 9/322; E06B 9/264; E06B 9/56; E06B 2009/2627; E06B 2009/2435; E06B 2009/3222; B65H 75/486; B60J 1/2016

USPC .... 267/155, 154, 166, 179, 71, 226, 291, 34
See application file for complete search history.

(56) References Cited

U.S. PATENT DOCUMENTS

| | | | | |
|---|---|---|---|---|
| 2,482,883 | A * | 9/1949 | Thomas | A01D 80/02 267/155 |
| 8,210,230 | B2 * | 7/2012 | Glasl | B60J 1/2033 160/313 |
| 2007/0075471 | A1 * | 4/2007 | Kuehnle | F16F 1/06 267/155 |

FOREIGN PATENT DOCUMENTS

| | | |
|---|---|---|
| CN | 102041964 A | 5/2011 |
| DE | 102007051056 B3 | 4/2009 |

* cited by examiner

*Primary Examiner* — Robert A. Siconolfi
*Assistant Examiner* — San M Aung
(74) *Attorney, Agent, or Firm* — Ming Chow; Sinorica, LLC (57) ABSTRACT

A torsion assembly has a connection member and a torsion spring. The connection member has a connection segment and a holding protrusion. The connection segment has a connection hole. The holding protrusion is formed in the connection hole. The torsion spring has a spring body and a connection leg. The connection leg is connected with the connection segment of the connection member, and has a rod segment, a bent segment, and a hook segment. The connection leg is kept from escaping out of the connection hole by the holding protrusion.

8 Claims, 7 Drawing Sheets

TORSION ASSEMBLY FOR A CURTAIN

BACKGROUND OF THE INVENTION

1. Field of the Invention

The present invention relates to a torsion assembly, and more particularly to a torsion assembly for a curtain to provide a torsion force to a curtain fabric and to reel the curtain fabric around an axle automatically.

2. Description of Related Art

A curtain, such as a vehicle curtain, substantially comprises a curtain fabric connected with and reeled around an axle. The axle with the reeled curtain fabric is mounted in a tube, and the curtain fabric can be expanded or reeled around the axle via a slot defined in the tube. To automatically reel the curtain fabric around the axle, a torsion assembly is mounted in the tube to provide a torsion force to the axle.

A conventional torsion assembly has the following types. DE 10 2007 051 056B3, referred to as the '056 patent hereafter, discloses a torsion assembly that comprises a connection member and a torsion spring. The connection member is composed of multiple components. The torsion spring has an L-shaped connection leg, and the L-shaped connection leg is connected with and clamped by the connection member.

CN 102041964B, referred to as the '964 patent hereafter, discloses a rolling rod for a curtain having a torsion assembly. The torsion assembly of the '964 patent has a connection member and a torsion spring. The connection member of the '964 patent is formed as a single part and has a block protruding from the connection member. The torsion spring is spiral, is mounted around the connection member, and is connected with the block on the connection member with one end of the torsion spring. The structure of the connection member of the '964 patent is simpler than that of the '056 patent. However, in assembling the torsion spring with the connection member, to connect one end of the torsion spring with the block on the connection member and further to mount the torsion spring around the connection member is troublesome.

In addition, the torsion spring of another type of the conventional torsion assembly has a connection leg that is formed L-shaped or U-shaped. The connection member has a holding hole to connect with the connection leg of the torsion spring. To assemble the connection leg of the torsion spring with the holding hole in the connection member is easier than to mount an end of the torsion spring around the connection member as the '056 patent.

A U-shaped connection leg of a torsion spring can provide a firmer connection with the connection member than that between the L-shaped connection leg and the connection member. However, to fit and connect with the U-shaped connection leg, the holding hole in the connection member has to be elongated. However, after the torsion assembly is mounted in the tube of a curtain, the U-shaped connection leg is easily deformed and escapes from the holding hole when the torsion spring is applied with a force along an axis of the torsion spring.

To overcome the shortcomings, the present invention tends to provide a torsion assembly to mitigate or obviate the aforementioned problems.

SUMMARY OF THE INVENTION

The main objective of the invention is to provide a torsion assembly that can prevent a connection leg of a torsion spring from escaping from a connection member.

The torsion assembly has a connection member and a torsion spring. The connection member has a shaft, a connection segment, and a holding protrusion. The shaft has an end. The connection segment is formed on the end of the shaft and has a connection hole and a holding groove. The connection hole is radially defined through the connection segment and has a connection surface formed in a side of the connection hole that is adjacent to the shaft. The holding groove is defined in the connection surface of the connection hole. The holding protrusion is formed in the connection hole and has an end extending toward the connection surface of the connection hole. The torsion spring has a spring body and a connection leg. The spring body is mounted around the shaft of the connection member and has an end and an axis. The connection leg is formed on and extends from the end of the spring body, is connected with the connection segment of the connection member, and has a rod segment, a bent segment, and a hook segment. The rod segment is formed on and protrudes from the end of the spring body, is parallel with the axis of the spring body, and has an end opposite the spring body. The bent segment is connected with the end of the rod segment, is perpendicular to the rod segment, extends toward the axis of the spring body, is held in the holding groove in the connection member to be kept from escaping out of the holding groove by the holding protrusion, and has an end opposite the rod segment. The hook segment is connected with the end of the bent segment, is perpendicular to the bent segment, and extends toward the spring body. The rod segment and the hook segment are located respectively at two diametrical ends of the connection segment of the connection member.

Other objects, advantages and novel features of the invention will become more apparent from the following detailed description when taken in conjunction with the accompanying drawings.

DETAILED DESCRIPTION OF PREFERRED EMBODIMENT

Figure 1:
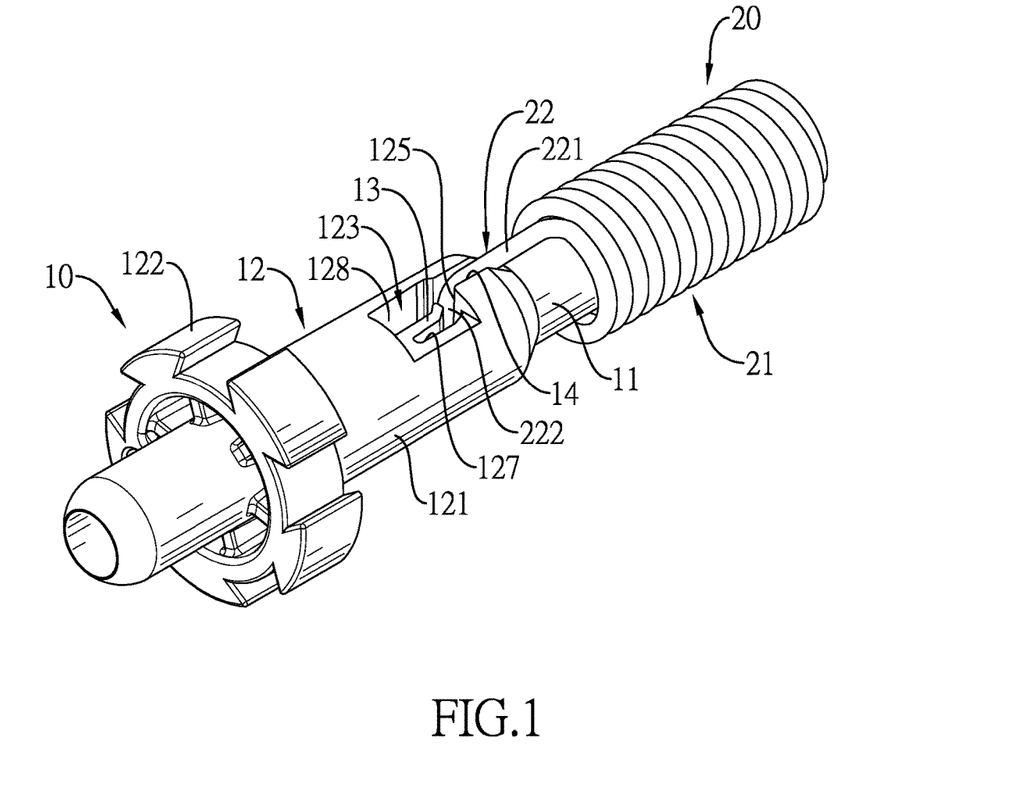
FIG. 1 is a perspective view of a torsion assembly in accordance with the present invention.
Figure 2:
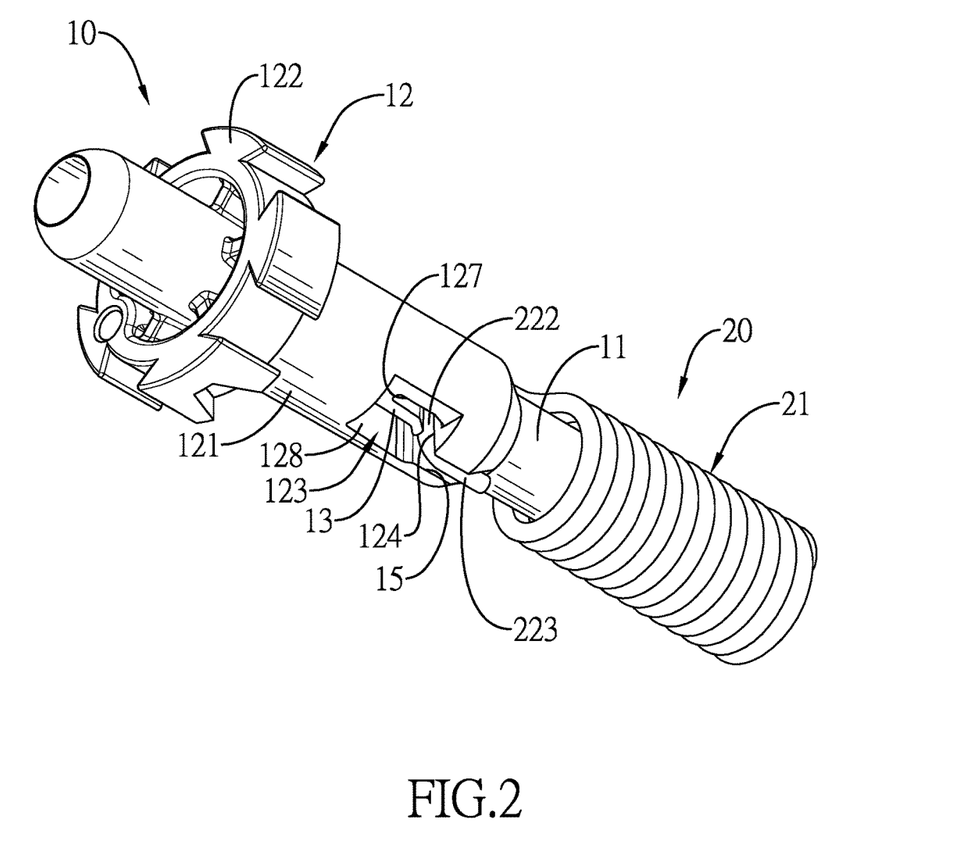
FIG. 2 is another perspective view of the torsion assembly in FIG. 1.
Figure 3:
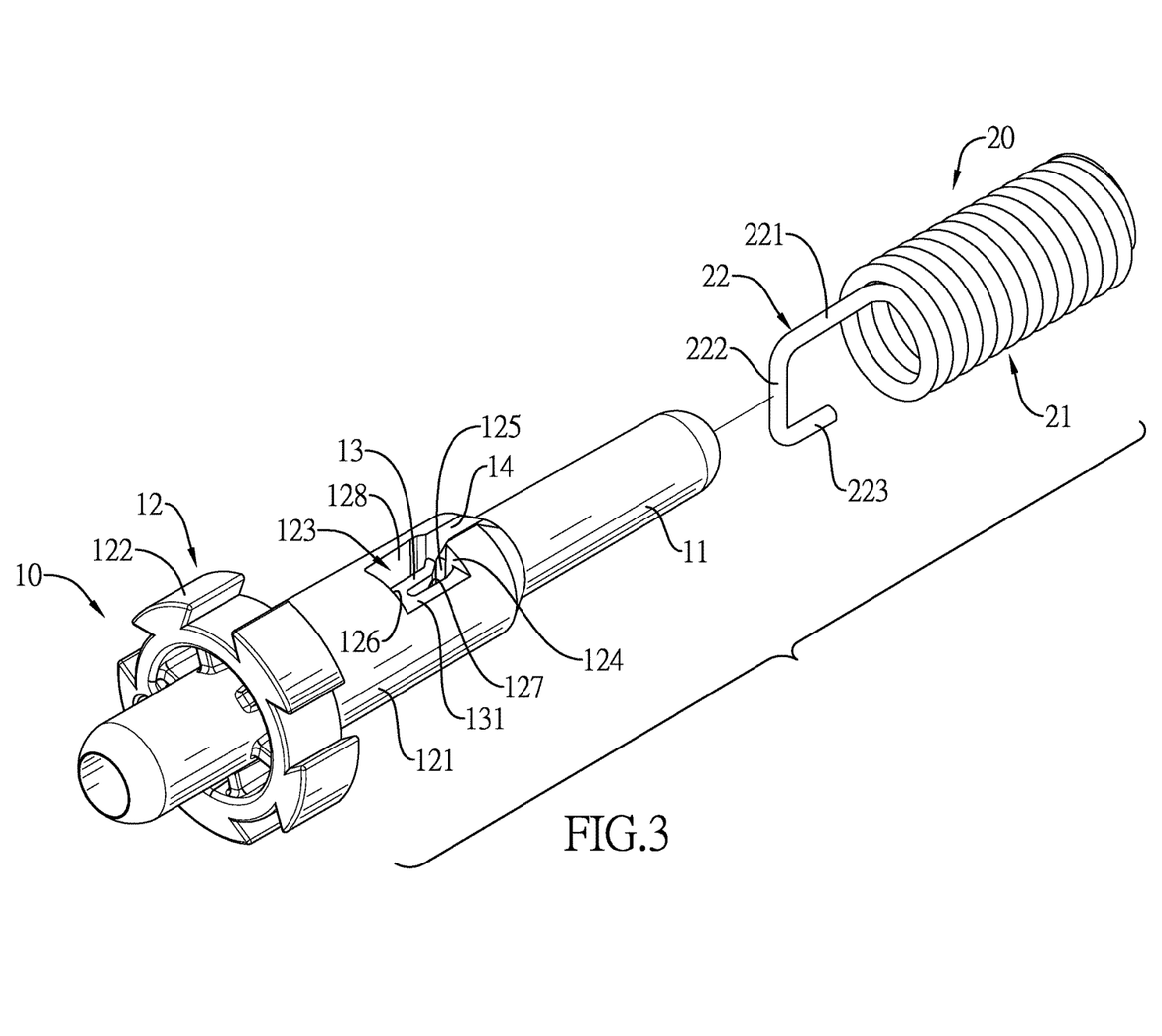
FIG. 3 is an exploded perspective view of the torsion assembly in FIG. 1.

With reference to FIGS. 1 to 3, a torsion assembly in accordance with the present invention comprises a connection member 10 and a torsion spring 20.

With reference to FIGS. 1 to 4, the connection member 10 comprises a shaft 11, a connection segment 12, and a holding protrusion 13. The shaft 11 may be cylindrical. The connection segment 12 is formed on an end of the shaft 11 and has a rod body 121 and a connection hole 123. The rod body 121 is cylindrical and has a diameter larger than that of the shaft 11. The rod body 121 has an annular toothed collar 122 mounted on the rod body 121 at an end opposite the shaft 11. The connection hole 123 is elongated, and is radially defined through the connection segment 12 to form two openings respective at two diametrical ends of the rod body 121. The connection hole 123 has a connection surface 124 formed in a side of the connection hole 123 that is adjacent to the shaft 11. A holding groove 125 is defined in the connection surface 124 of the connection hole 123. The connection hole 123 further has a back surface 126 formed on a side of the connection hole 123 that is opposite the connection surface 124. The connection segment 12 of the connection member 10 further comprises a first positioning groove 14 and a second positioning groove 15. The first positioning groove 14 is defined radially in the connection segment 12 and is located between the shaft 11 and a first diametrical end of the connection hole 123. The second positioning groove 15 is defined radially in the connection segment 12 and is located between the shaft 11 and a second diametrical end of the connection hole 123 that is diametrically opposite the first diametrical end of the connection hole 123. The holding groove 125 communicates with the first positioning groove 14 and the second positioning groove 15. The holding protrusion 13 is mounted in the connection hole 123 and has an end that extends toward the holding groove 125 defined in the connection surface 124 of the connection hole 123.

Preferably, the holding protrusion 13 is formed on and protrudes from the back surface 126 of the connection hole 123 and extends toward the holding groove 125 defined in the connection surface 124. The end of the holding protrusion 13 that is adjacent to the holding groove 125 is a free end. The holding protrusion 13 is bendable and resilient to allow the holding protrusion 13 to return to an original status with resilience. With reference to FIGS. 1 to 3, and 6, the connection hole 123 further has two opposite surfaces 127,128 between the connection surface 124 and the back surface 126. The two opposite surfaces 127,128 of the connection hole 123 are free from being flush with each other at ends of the two opposite surfaces 127,128. The two opposite surfaces 127,128 are respectively defined as a short surface 127 and a high surface 128. The holding protrusion 13 has a top being flush with a top end of the short surface 127 of the connection hole 123.

Figure 4:
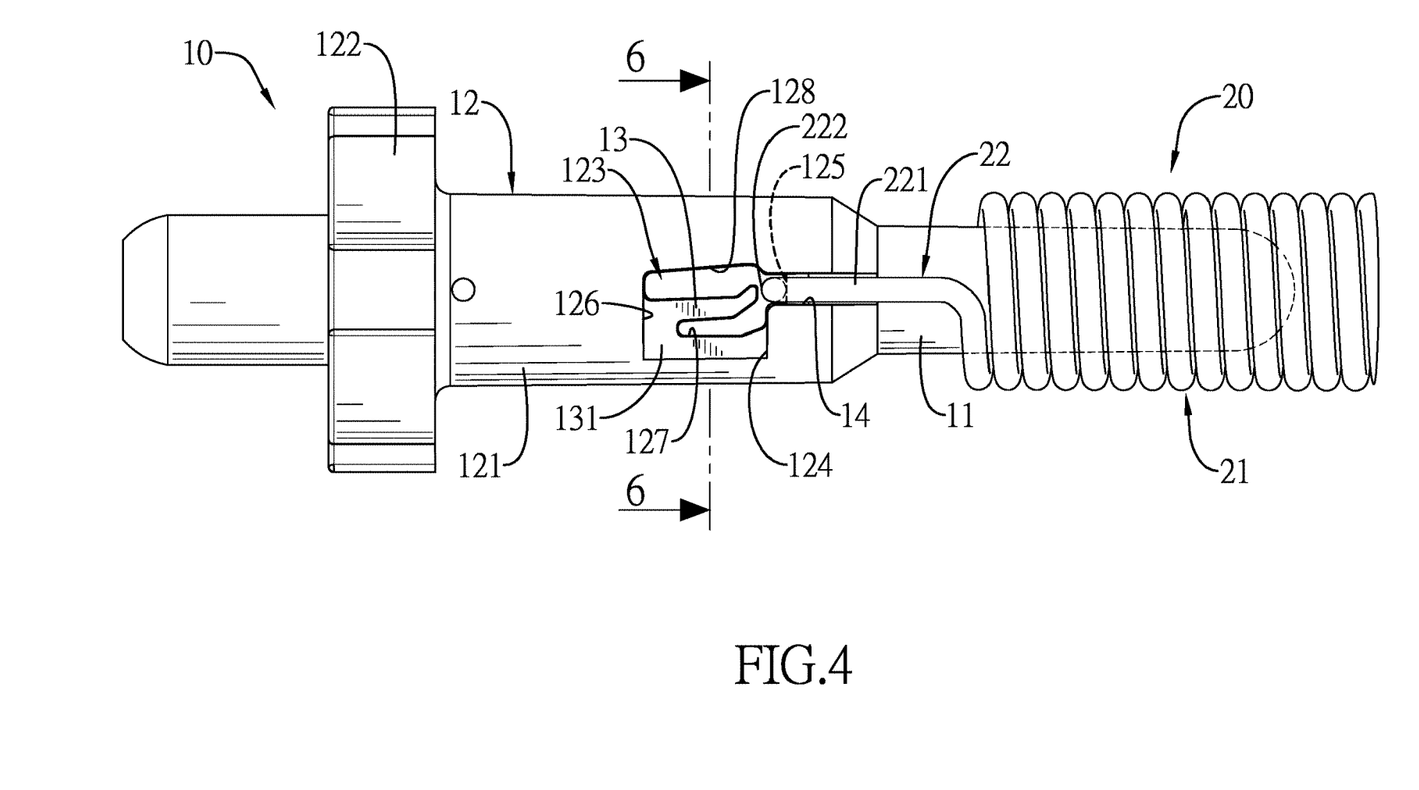
FIG. 4 is a top view of the torsion assembly in FIG. 1.
Figure 5:
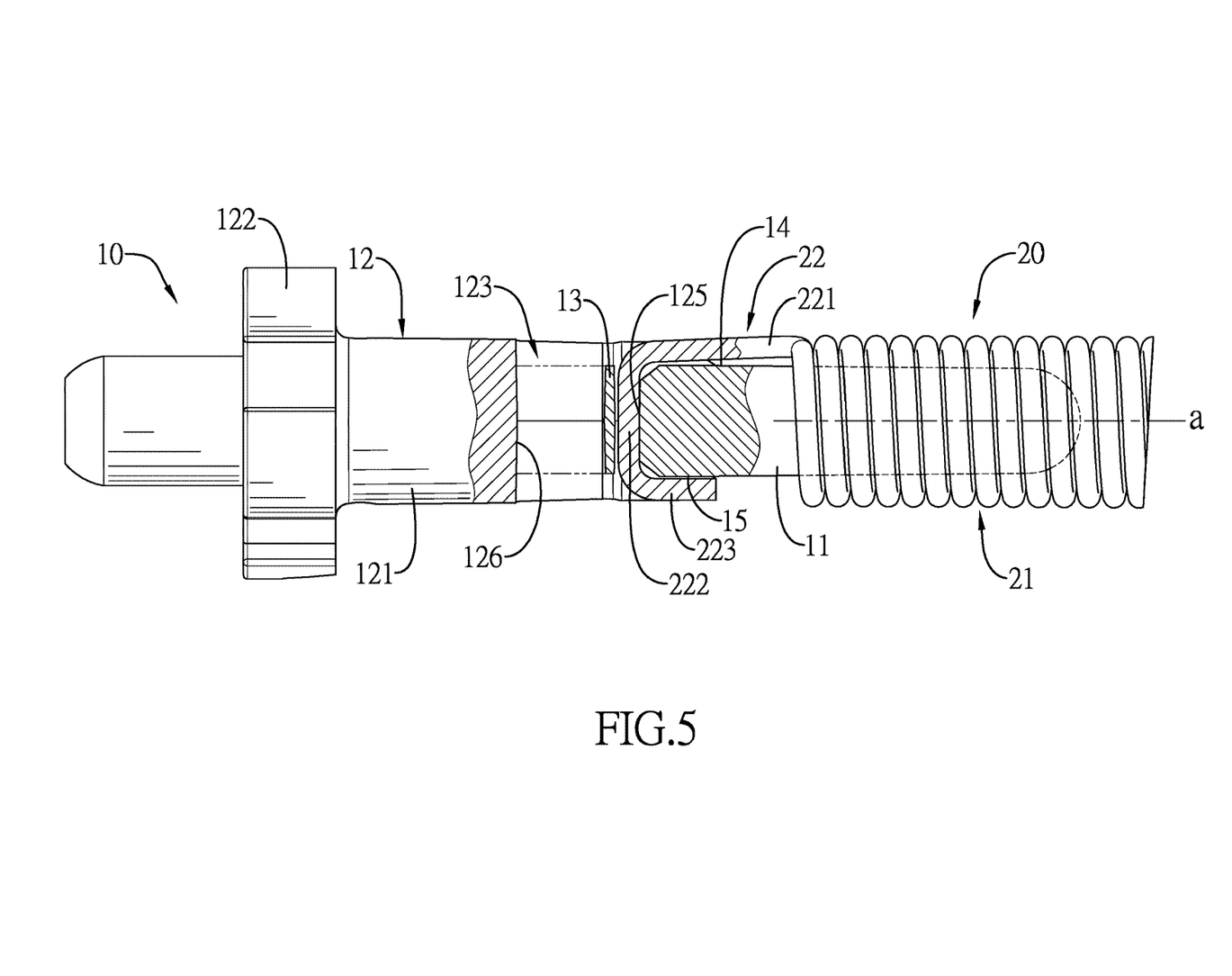
FIG. 5 is a side view in partial section of the torsion assembly in FIG. 1.

With reference to FIGS. 1 to 3, the torsion spring 20 comprises a spring body 21 and a connection leg 22. The spring body 21 is spiral, is mounted around the shaft 11 of the connection member 10, and has an end and an axis a. The connection leg 22 is formed on and extends from the end of the spring body 21, is connected with the connection segment 12 of the connection member 10, and has a rod segment 221, a bent segment 222, and a hook segment 223. The rod segment 221 is formed on and protrudes from the end of the spring body 21, is parallel with the axis a of the spring body 21, and has an end opposite the spring body 21. The bent segment 222 is connected with the end of the rod segment 221, is perpendicular to the rod segment 221, extends toward the axis a of the spring body 21, and has an end opposite the rod segment 221. The hook segment 223 is connected with the end of the bent segment 222, is perpendicular to the bent segment 222, extends toward the spring body 21, and is substantially parallel with the rod segment 221. With reference to FIGS. 4 and 5, the rod segment 221 is held in the first positioning groove 14. The bent segment 222 is held in the holding groove 125 and is kept from escaping out of the holding groove 125 by the holding protrusion 13. Preferably, the distance between the free end of the holding protrusion 13 and the bent segment 222 is smaller than the diameter of the bent segment 222. The hook segment 223 is held in the second positioning groove 15. Accordingly, the torsion spring 20 is connected with the connection member 10.

Figure 6:
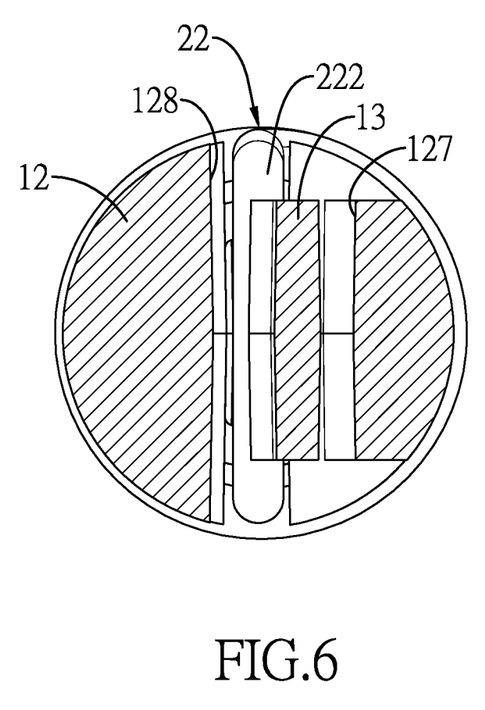
FIG. 6 is a cross sectional end view of the torsion assembly along line 6-6 in FIG. 4.
Figure 7:
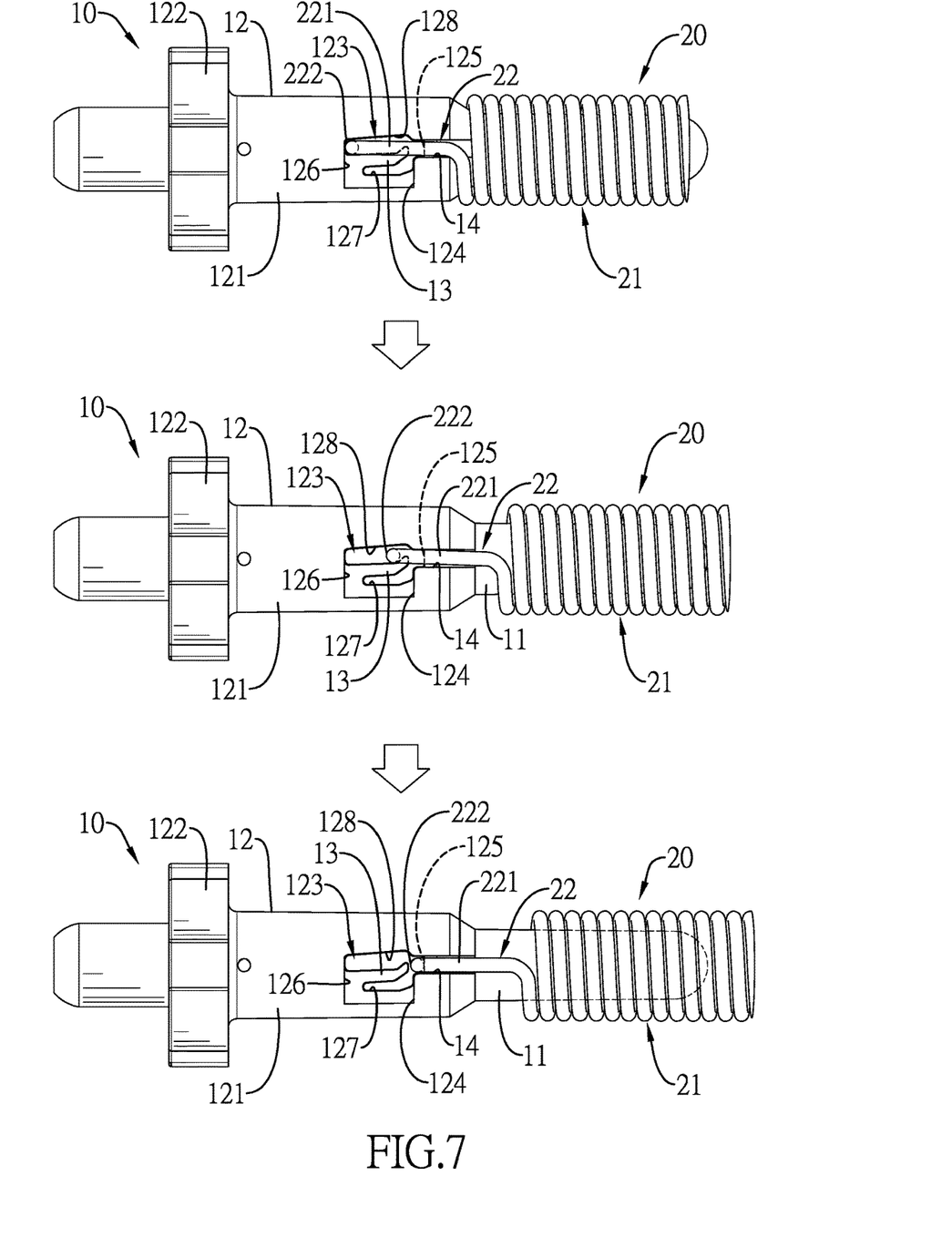
FIG. 7 shows operational top views of the torsion assembly in FIG. 1.

With reference to FIGS. 3, 6, and 7, to connect the torsion spring 20 with the connection member 10, the spring body 21 is mounted around the shaft 11 of the connection member 10 first and the connection leg 22 of the torsion spring 20 extends toward the connection segment 12 of the connection member 10. With the arrangement of the opposite surfaces 127,128 at different heights of the connection hole 123, the connection leg 22 can enter the connection hole 123 by passing over the top end of the short surface 127, wherein the bent segment 222 is located between the high surface 128 and the holding protrusion 13. Then, the connection leg 22 is moved toward the connection surface 124 of the connection hole 123 and pushes the holding protrusion 13 to be deformed toward the short surface 127. When the bent segment 222 enters the holding groove 125 and is held in the holding groove 125, the holding protrusion 13 will be restored to the original status by resilience. Consequently, the bent segment 222 is limited by the holding protrusion 13. The rod segment 221 will be held in the first positioning groove 14, and the hook segment 223 will be held in the second positioning groove 15 at the same time. Accordingly, the torsion spring 20 is connected with the connection member 10.

Preferably, the width of the holding groove 125 is equal to or slightly larger than the diameter of the bent segment 222. The width of the first positioning groove 14 is equal to or slightly larger than the diameter of the rod segment 221. The width of the second positioning groove 15 is equal to or slightly larger than the diameter of the hook segment 223.

The torsion assembly in accordance with the present invention is mounted in a tube of a curtain and is connected with an axle of the curtain. When a curtain fabric of the curtain is expanded, the torsion spring 20 is twisted. When the curtain fabric is released, the torsion spring 20 can provide a torque to the axle and to automatically reel the curtain fabric around the axle.

The torsion spring 20 has a continuously-bent connection leg 22 to connect with the connection hole 123 in the connection segment 12 of the connection member 10. With the arrangement of the holding protrusion 13, the connection leg 22 of the torsion spring 20 is prevented from escaping from the connection hole 123 easily. Therefore, the connection between the torsion spring 20 and the connection member 10 is enhanced and firm. Thus, the torsion assembly in accordance with the present invention can keep providing an excellent torque to the axle for a long time.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A torsion assembly comprising:
 a connection member comprising
  a shaft having an end;
  a connection segment formed on the end of the shaft and having
   a connection hole radially defined through the connection segment and having a connection surface formed in a side of the connection hole that is adjacent to the shaft; and a holding groove defined in the connection surface of the connection hole;

a holding protrusion formed in the connection hole and having an end extending toward the connection surface of the connection hole; and a torsion spring comprising a spring body mounted around the shaft of the connection member and having an end and an axis;

a connection leg formed on and extending from the end of the spring body, connected with the connection segment of the connection member, and having a rod segment formed on and protruding from the end of the spring body, being parallel with the axis of the spring body, and having an end opposite the spring body;

a bent segment connected with the end of the rod segment, being perpendicular to the rod segment, extending toward the axis of the spring body, held in the holding groove in the connection member to be kept from escaping out of the holding groove by the holding protrusion, and having an end opposite the rod segment; and a hook segment connected with the end of the bent segment, being perpendicular to the bent segment, and extending toward the spring body, wherein the rod segment and the hook segment are located respectively at two diametrical ends of the connection segment of the connection member.

2. The torsion assembly as claimed in claim 1, wherein the connection hole further has a back surface formed on a side of the connection hole opposite the connection surface; and the holding protrusion is formed on and protruding from the back surface.

3. The torsion assembly as claimed in claim 2, wherein the connection hole further has two opposite surfaces facing the connection leg of the torsion spring and the two opposite surfaces are free from being flush with each other at ends of the two opposite surfaces and are respectively defined as a high surface and a short surface.

4. The torsion assembly as claimed in claim 3, wherein the holding protrusion has a top being flush with a top end of the short surface of the connection hole.

5. The torsion assembly as claimed in claim 4, wherein the connection segment of the connection member further comprises a first positioning groove defined radially in the connection segment and located between the shaft and a first diametrical end of the connection hole; and a second positioning groove defined radially in the connection segment and located between the shaft and a second diametrical end of the connection hole that is diametrically opposite the first diametrical end of the connection hole;

the holding groove communicates with the first positioning groove and the second positioning groove;

the rod segment of the connection leg of the torsion spring is held in the first positioning groove; and the hook segment of the connection leg of the torsion spring is held in the second positioning groove.

6. The torsion assembly as claimed in claim 3, wherein the connection segment of the connection member further comprises a first positioning groove defined radially in the connection segment and located between the shaft and a first diametrical end of the connection hole; and a second positioning groove defined radially in the connection segment and located between the shaft and a second diametrical end of the connection hole that is diametrically opposite the first diametrical end of the connection hole;

the holding groove communicates with the first positioning groove and the second positioning groove;

the rod segment of the connection leg of the torsion spring is held in the first positioning groove; and the hook segment of the connection leg of the torsion spring is held in the second positioning groove.

7. The torsion assembly as claimed in claim 2, wherein the connection segment of the connection member further comprises a first positioning groove defined radially in the connection segment and located between the shaft and a first diametrical end of the connection hole; and a second positioning groove defined radially in the connection segment and located between the shaft and a second diametrical end of the connection hole that is diametrically opposite the first diametrical end of the connection hole;

the holding groove communicates with the first positioning groove and the second positioning groove;

the rod segment of the connection leg of the torsion spring is held in the first positioning groove; and the hook segment of the connection leg of the torsion spring is held in the second positioning groove.

8. The torsion assembly as claimed in claim 1, wherein the connection segment of the connection member further comprises a first positioning groove defined radially in the connection segment and located between the shaft and a first diametrical end of the connection hole; and a second positioning groove defined radially in the connection segment and located between the shaft and a second diametrical end of the connection hole that is diametrically opposite the first diametrical end of the connection hole;

the holding groove communicates with the first positioning groove and the second positioning groove;

the rod segment of the connection leg of the torsion spring is held in the first positioning groove; and the hook segment of the connection leg of the torsion spring is held in the second positioning groove.

* * * * *